United States Patent [19]

Kenney

[11] 4,104,263

[45] Aug. 1, 1978

[54] PROCESS FOR PRODUCING FILM AND FIBER-FORMING POLYALKYLENE TEREPHTHALATE

[75] Inventor: James F. Kenney, Mendham, N.J.

[73] Assignee: M&T Chemicals Inc., Stamford, Conn.

[21] Appl. No.: 761,338

[22] Filed: Jan. 21, 1977

Related U.S. Application Data

[62] Division of Ser. No. 670,654, Mar. 26, 1976.

[51] Int. Cl.² ............................................. C08G 63/14
[52] U.S. Cl. ..................................... 528/279; 560/92; 528/285; 528/305
[58] Field of Search ........................ 260/75 R, 475 P; 560/92

[56] References Cited

U.S. PATENT DOCUMENTS

| | | | |
|---|---|---|---|
| 2,720,504 | 10/1955 | Caldwell et al. | 260/75 R |
| 2,951,060 | 8/1960 | Billica | 260/75 R |
| 3,009,903 | 11/1961 | Lincoln | 260/75 R |
| 3,110,693 | 11/1963 | Ure | 260/75 R X |
| 3,415,860 | 12/1968 | Thomas | 260/75 R X |
| 3,484,410 | 12/1969 | Lazarus et al. | 260/75 R |
| 3,624,049 | 11/1971 | Ventura et al. | 260/75 R X |
| 3,705,133 | 12/1972 | Lazarus et al. | 260/75 R |

*Primary Examiner*—Lucille M. Phynes
*Attorney, Agent, or Firm*—Kenneth G. Wheeless; Robert Spector

[57] ABSTRACT

High molecular weight, colorless polyesters suitable for shaping into filaments and films are obtained using novel catalysts selected from the group consisting of reaction products of specified antimony or zirconium (IV) compounds with 1) a carboxylate of calcium, manganese or zinc and 2) an acid anhydride, alcohol or glycol. The molar ratio of the antimony or zirconium compound to the aforementioned carboxylate is between 1:1 and 1:6. The catalysts are active in both transesterification and polycondensation. The rates of these reactions are more rapid than can be achieved using prior art catalysts.

22 Claims, No Drawings

PROCESS FOR PRODUCING FILM AND FIBER-FORMING POLYALKYLENE TEREPHTHALATE

This is a divisional of application Ser. No. 670,654, filed Mar. 26, 1976.

BACKGROUND OF THE INVENTION

This invention relates to the preparation of linear, fiber forming, colorless polyesters. This invention further relates to a novel class of compounds that are useful as both transesterification and polycondensation catalysts for the preparation of colorless, fiber forming polyesters and to a method for preparing these compounds.

High molecular weight polyesters, particularly polyethylene terephthalate, are employed in large quantities for the preparation of textile fibers in addition to films for packaging and other uses. Polyesters of this type are produced on a commercial scale by reacting a dialkyl ester of a carboxylic acid with an alkylene glycol. The acid can be aliphatic or aromatic, however the acid used most frequently to prepared fiber forming polyesters is terephthalic acid, usually in the form of the dimethyl ester, and the most preferred glycol is ethylene glycol. Typically the terephthalic acid ester and glycol are reacted at temperatures from 140 to about 220° C. under atmospheric pressure. The reaction is continued until substantially all of the methanol or other alcohol present in the initial dialkyl terephthalate has been removed from the reaction mixture. This stage of polyester preparation, known as ester interchange or transesterification, is conventionally conducted in the presence of a catalyst. Compounds which have heretofore been employed for this purpose include salts of the alkali metals and alkaline earth metals. The free metals themselves have also been employed, as have salts of manganese and zinc. The presence of these compounds or elements in catalytic amounts during the subsequent polycondensation stage is, in some instances, detrimental to certain properties, particularly color, of the final polyester. It is therefore common practice to add a sequestering agent such as a triester of phosphorous acid or other phosphorus compound for the purpose of inactivating the transesterification catalyst.

The second phase of polyester production is a polycondensation of the glycol ester formed during the ester interchange stage. The polycondensation is conventionally conducted at temperatures from 200° to 300° C., preferably from 270° to 290° C. under an inert atmosphere at pressures as low as can practically be achieved to minimize thermally induced degradation of the prepolymer. Removal of the by-product alkylene glycol as it is formed is considered essential to achieve the desired higher molecular weight. The polycondensation step usually requires from 1 to 4 hours. The final polymer desirably exhibits an inherent viscosity greater than 0.5. Catalysts conventionally employed for the polycondensation step include compounds of antimony, titanium and tin. The catalytic activity of soluble antimony compounds such as antimony triacetate is considered outstanding, however many of these compounds are readily reduced to gray elemental antimony, particularly under the conditions employed for polycondensation. Since elemental antimony often imparts a gray color to the polymer, soluble antimony catalysts may not be useful for preparing colorless polymer in the absence of pigments or delusterants. Moreover, trivalent antimony compounds such as acid salts and alkoxides are readily hydrolyzed by the small amounts of water present in the atmosphere to form products that are insoluble even in catalytic amounts in the polycondensation reaction mixture.

The color and other properties of a polyester may be adversely affected by products of side reactions that occur during transesterification and polycondensation. Some polycondensation catalysts also catalyze formation of these by-products, which may include diethylene glycol and higher oligomers of ethylene glycol. These oligomers are particularly undesirable since they reduce the light stability of the polyester when incorporated into the polymer chain in place of ethylene glycol. In addition, polymer segments containing the aforementioned oligomers often exhibit a different affinity for dyes than "conventional" polymer segments, resulting in undesirable shade variations along the length of a fiber or between fibers prepared from different batches of the same polymer.

One objective of this invention is to define a class of catalysts that will yield colorless, high molecular weight polyesters. A second objective is to define a class of compounds that catalyze both ester interchange and polycondensation, do not require use of a sequestering agent and do not adversely affect the chemical or physical properties of the final polymer. Another objective is to decrease the minimum time intervals required for transesterification and polycondensation using prior art catalysts.

The foregoing objectives are achieved using a novel class of bimetallic compounds which catalyze both transesterification and polycondensation.

SUMMARY OF THE INVENTION

This invention provides a method for producing high molecular weight, substantially colorless film and fiber forming polyalkylene terephthalates whereby an alkylene glycol containing from 2 to 10 carbon atoms is reacted under ester interchange conditions with a lower dialkyl terephthalate wherein the alkyl residue of the terephthalate preferably contains from 1 to 4 carbon atoms. The resultant glycol terephthalate is polycondensed at a temperature from 200 to 300° C. under reduced pressure. The only catalyst present during transesterification and polycondensation is from about 0.01 to about 0.3%, based on the weight of the lower dialkyl terephthalate, of a bimetallic compound obtained by reacting (1) a first compound selected from the group consisting of antimony (III) salts of monocarboxylic and dicarboxylic acids, antimony (III) and zirconium (IV) alkoxides wherein the alkyl residues contain from 1 to 12 carbon atoms and antimony trioxide, (2) a second compound selected from the group consisting of zinc, calcium and manganese salts of monocarboxylic acids and zinc, calcium and manganese salts of dicarboxylic acids, the molar ratio of said first to said second compound being from 1:1 to 1:6, respectively, and (3) at least a stoichiometric amount of a third compound selected from the group consisting of anhydrides of monocarboxylic and dicarboxylic acids, alcohols containing from 1 to 20 carbon atoms and glycols containing from 2 to 20 carbon atoms. The present catalysts are novel compounds and, as such, constitute part of the present invention.

DETAILED DESCRIPTION OF THE INVENTION

The present catalysts contain trivalent antimony or tetravalent zirconium in combination with manganese, zinc or calcium. The catalysts also contain at least one residue obtained by removing the labile hydrogen atoms from the oxygen atom of an alcohol, glycol or carboxylic acid. The catalysts can be prepared by reacting antimony trioxide or a zirconyl salt with a manganese, zinc or calcium salt of a carboxylic acid in the presence of at least a stoichiometric amount of an alcohol, glycol or carboxylic acid anhydride. A corresponding antimony salt may optionally be employed in place of antimony trioxide.

Alternatively the antimony or zirconyl salt can be prepared in the presence of the manganese, zinc or calcium salt by reacting the desired carboxylic acid with an antimony trihalide or a zirconium (IV) halide. The halide can be the chloride, bromide or iodide.

Suitable monocarboxylic acids are represented by formula RCOOH, wherein R is alkyl, cycloalkyl, aryl, alkaryl or aralkyl. Representative alkyl groups include methyl, ethyl, n-propyl, isopropyl and higher homologs containing up to 19 carbon atoms, preferably from 1 to 11 atoms, in a linear or branched chain. The alkyl group may optionally contain inert substituents, such as a phenyl group. When R is aryl it can be phenyl or naphthyl and may optionally contain one or more inert substituents, such as alkyl groups. Useful dicarboxylic acids correspond to the formula HOOCR'COOH wherein R' is a divalent equivalent of R and contains from 1 to 18 carbon atoms.

The alcohol, glycol or anhydride is a liquid at the temperature of the reaction and is preferably employed in considerable excess over the stoichiometric amount required to replace the anionic portion of all the initial salts, and thereby functions as both reagent and diluent. An additional inert organic diluent can optionally be employed to lower the boiling point of the reaction mixture to within the desired range of from 100° to about 200° C. The reaction is preferably carried out at the boiling point to facilitate removal of any water formed as a by-product of the reaction. The reaction between the salts and the hydroxyl compound or anhydride is substantially complete in from 1 to 3 hours. The product, a bimetallic alkoxide or carboxylate, is only slightly soluble in the diluent, particularly at ambient temperatures, and is readily isolated from the reaction mixture by filtration or decantation.

The molar ratio of the trivalent antimony or tetravalent zirconium compound to the manganese, zinc or calcium salt is from 1:1 to 1:6. A molar ratio of 1:4 is preferred.

The existence of the present catalysts as single compounds rather than as mixtures of salts has been confirmed by differential thermal analysis. Those compounds derived from monofunctional alcohols or acid anhydrides exhibit a sharp endothermic melting point characteristic of a single crystalline compound rather than a mixture of compounds. The physical properties of catalysts derived from glycols or anhydrides of polyfunctional acids resemble those of known polymeric metalloorganic compounds. These compounds do not melt below 450° C.

In a typical preparation of one of the present catalysts, a mixture of antimony trioxide, manganese acetate, acetic anhydride and toluene is heated to the boiling point, the refluxing liquid being collected in a suitable receiver. Heating is continued for from 1 to 2 hours, during which time the temperature of the distillate increases to 102° C. A white solid is isolated by filtration once the reaction mixture has cooled to ambient temperature. The product of this reaction is a manganese antimony acetate that melts sharply at 310° C. and contains 22.4% manganese and 20.8% antimony.

Glycols and alcohols suitable for preparing the present catalysts contain from 1 to 20 carbon atoms. It will be understood that glycols contain at least 2 carbon atoms. Suitable carboxylic acid anhydrides contain from 2 to 20 carbon atoms if derived from a dicarboxylic acid such as succinic acid and from 4 to 40 carbon atoms if derived from a monocarboxylic acid.

One unique feature of the present catalysts is that they are active in both transesterification and polycondensation. This type of activity is uncommon among prior art polycondensation catalysts, which are conventionally employed in combination with a transesterification catalyst, as previously disclosed. The transesterification catalyst often has an adverse effect on the rate of the polycondensation reaction or the properties of the final polymer, which usually requires addition of a sequestering agent such as a triester of phosphorous acid following completion of the transesterification phase.

The present catalysts are eminently suitable for preparing polyethylene terephthalate by the polycondensation of bis(2-hydroxyethyl) terephthalate obtained from dimethyl terephthalate and ethylene glycol. The same catalysts can also be used when preparing this polyester by direct esterification of terephthalic acid with ethylene glycol. If it is desired to prepare a copolyester, up to 50% by weight of the dimethyl terephthalate or terephthalic acid can be replaced by dimethyl isophthalate or isophthalic acid, depending upon whether a transesterification or direct esterification process is employed to prepare the polymer.

The present catalysts are employed at a concentration of between 0.01 and 0.3%, based on the weight of lower dialkyl terephthalate when the latter compound is employed as a starting material.

When the present compounds are used to catalyze a polycondensation of bis(2-hydroxyethyl) terephthalate formed by direct esterification rather than transesterification, the foregoing concentration limits also apply, and are based on the weight of this monomer.

While the catalysts of this invention are particularly suitable for the preparation of polyethylene terephthalate, as demonstrated in the accompanying examples, it should be understood that these catalysts can be employed to prepare polyesters derived from the reaction of any dicarboxylic acid with any glycol. The term "glycol" refers to a specific class of diols wherein the two hydroxyl groups are located on adjacent carbon atoms. Mixtures of acids, glycols or both can be employed to prepare copolymers. The starting material for these polyesters can be any low molecular weight glycol ester of the desired dicarboxylic acid or mixture of such esters. Suitable dicarboxylic acids include phthalic, isophthalic, adipic and sebacic acids.

The present catalysts can be added to the reaction mixture as a solid in the absence of any liquid. Alternatively, the solid catalyst can be dissolved or uniformly dispersed in a liquid diluent. Since the present catalysts are soluble in alkylene glycols in the amount required to catalyze transesterification and polycondensation, these glycols are particularly suitable media for introducing the catalyst.

The present catalysts are suitable for preparing colorless ethylene terephthalate homopolymers and copolymers on a relatively small laboratory scale as well as in considerably larger quantities by a batch or a continuous process. Using the present catalysts it is possible to prepare these polymers at a considerably more rapid rate than could heretofore be achieved using prior art catalysts.

Differential Thermal Analysis (DTA) thermograms of the catalysts disclosed in the accompanying examples were obtained under a nitrogen atmosphere in the temperature range from 25° to 450° C. at a heating rate of 15° C. per minute. Each sample was inserted into a glass capillary tube such that the height of the sample in the tube was three millimeters. Glass beads were used as the reference.

Differential Scanning Calorimetry (DSC) thermograms of the polyethylene terephthalate products were obtained under a nitrogen atmosphere in the temperature range from 25° to 400° C. with a heating rate of 20° C. per minute. The sample size was 10 milligrams and an open pan was used as the reference.

Inherent viscosity was measured at 30° C. using a 0.5% solution of the polyester in phenol/tetrachloroethane (60/40).

Examples 1-14 disclose the preparation of representative catalysts within the scope of the present claims. Examples 15-28 teach the preparation of polyethylene terephthalate using these catalysts and, for purposes of comparison, a representative prior art catalyst. All parts and percentages are by weight unless otherwise stated.

EXAMPLE 1

A reaction vessel equipped with a nitrogen inlet, agitator, thermometer and water-cooled condenser was charged with 107 parts manganese acetate tetrahydrate, 250 parts ethylene glycol and 29 parts antimony trioxide. This mixture was heated to the boiling point. A total of 128 parts of the refluxing liquid was collected, during which time the temperature of the reaction mixture increased from 145° to 189° C. The distillate was a mixture containing ethylene glycol, water and acetic acid. When no further increase of reaction mixture temperature with time was noted, the reaction mixture was allowed to cool to ambient temperature. The reddish-brown solid present in the reaction vessel was isolated, washed using anhydrous methanol and then dried at 75° C. under reduced pressure. The solid was found to contain 18.4% manganese and 23.6% antimony. The thermogram obtained using differential thermal analysis (DTA) exhibited no endothermic melting peak and no exothermic peak characteristic of decomposition within the range from 25° to 450° C. These data indicate that the compound is amorphous and polymeric in nature.

EXAMPLE 2

The reaction vessel was charged with 19.8 parts of manganese acetate tetrahydrate, 222 parts of butyl alcohol and 5.8 parts of antimony trioxide. The mixture was heated with stirring to the boiling point (100° C.) under a nitrogen atmosphere. A total of 100 parts of distillate were collected, during which time the temperature gradually increased to 115° C. No further increase in reaction mixture temperature with time was noted, whereupon the reaction mixture was allowed to cool to ambient temperature. The solid phase was isolated by filtration and dried under reduced pressure at a temperature of 90° C. Twenty parts of a white powder were obtained, and found to contain 23.06% manganese and 24.05% antimony. The DTA thermogram exhibited an endotherm at 335° C. indicative of the melting point exhibited by a crystalline compound and no degradative type of exothermic peak up to 425° C.

EXAMPLE 3

The reaction vessel was charged with 19.8 parts of manganese acetate tetrahydrate, 250 parts of toluene, 5.8 parts of antimony trioxide and 51 parts of acetic anhydride. The mixture was heated with stirring to the boiling point (85° C.) under a nitrogen atmosphere. A total of 100 parts of distillate were collected, during which time the temperature gradually increased to 102° C. No further increase in reaction mixture temperature with time was noted, whereupon the reaction mixture was allowed to cool to ambient temperature. The solid phase was isolated by filtration and dried under reduced pressure at a temperature of 90° C. Twenty one parts of a white powder were obtained, which was found to contain 22.35% manganese and 20.82% antimony. The DTA thermogram exhibited an endothermic peak at 310° C. that was characteristic of a crystalline melting point and exhibited no degradative exothermic peak up to 425° C.

EXAMPLE 4

The reaction vessel was charged with 34.3 parts of zinc acetate dihydrate, 250 parts of ethylene glycol and 11.6 parts of antimony trioxide. The mixture was heated with stirring to the boiling point (160° C.) under a nitrogen atmosphere. A total of 125 parts of distillate were collected, during which time the temperature gradually increased to 188° C. No further increase in reaction mixture temperature with time was noted, whereupon the reaction mixture was allowed to cool to ambient temperature. The solid phase was isolated by filtration and dried under reduced pressure at a temperature of 80° C. Twenty five parts of a white powder were obtained, which was found to contain 18.5% zinc and 30.57% antimony. The DTA thermogram exhibited no endothermic peak indicative of a melting point and no exothermic peak indicative of degradation in the range from 25° to 450° C. The physical properties of the product are characteristic of an amorphous polymeric solid.

EXAMPLE 5

The reaction vessel was charged with 17.2 parts of zinc acetate dihydrate, 222 parts of butyl alcohol and 5.8 parts of antimony trioxide. The mixture was heated with stirring to the boiling point under a nitrogen atmosphere. A total of 100 parts of distillate were collected, during which time the temperature gradually increased to 110° C. and remained there for several minutes. The reaction mixture was then allowed to cool to ambient temperature, at which time the solid phase was isolated by filtration, washed with anhydrous methyl alcohol and dried under reduced pressure at a temperature of 80° C. Nine parts of a white powder were obtained, which was found to contain 25.77% zinc and 45.44% antimony. The DTA thermogram exhibited no endothermic peak indicative of melting and no exothermic peak in the range from 25° to 450° C. The physical properties of the product are characteristic of an amorphous polymeric solid.

EXAMPLE 6

The reaction vessel was charged with 17.6 parts of zinc acetate dihydrate, 250 parts of toluene, 5.8 parts of antimony trioxide and 51 parts of acetic anhydride. The mixture was heated with stirring to the boiling point (94° C.) under a nitrogen atmosphere. A total of 108 parts of distillate were collected, during which time the temperature gradually increased to 104° C. and remained there for several minutes. The reaction mixture was then allowed to cool to ambient temperature, at which time the solid phase was isolated by filtration and dried under reduced pressure at a temperature of 80° C. Twenty parts of a white powder were obtained, which was found to contain 24.52% zinc and 22.77% antimony. At 295° C. the DTA thermogram exhibited an endotherm indicative of the melting point exhibited by a crystalline material.

EXAMPLE 7

The reaction vessel was charged with 31 parts of calcium acetate monohydrate, 250 parts of ethylene glycol and 11.6 parts of antimony trioxide. The mixture was heated with stirring to the boiling point (172° C.) under a nitrogen atmosphere. A total of 100 parts of distillate were collected, during which time the temperature gradually increased to 190° C. and remained there for several minutes. The mixture was then allowed to cool to ambient temperature, at which time the solid phase was isolated by filtration, washed with anhydrous methanol and dried under reduced pressure at a temperature of 80° C. Thirty one parts of a white powder were obtained, which was found to contain 10.92% calcium and 34.94% antimony. The DTA thermogram exhibited no endotherm indicative of a melting point in the range from 25° to 350° C. The physical properties of the product are characteristic of an amorphous polymeric solid.

EXAMPLE 8

The reaction vessel was charged with 15.5 parts of calcium acetate monohydrate, 222 parts of butyl alcohol and 5.8 parts of antimony trioxide. The mixture was heated with stirring to the boiling point under a nitrogen atmosphere. A total of 100 parts of distillate were collected, during which time the temperature gradually increased to 113° C. and remained there for several minutes. The reaction mixture was then allowed to cool to ambient temperature, at which time the solid phase was isolated by filtration, washed with anhydrous methanol and dried under reduced pressure at a temperature of 80° C. Nineteen parts of a white powder were obtained, which was found to contain 20.99% calcium and 24.08% antimony. The DTA thermogram exhibited endotherms indicative of melting points at 245° and 460° C. There was no exothermic peak characteristic of degradation up to 475° C.

EXAMPLE 9

The reaction vessel was charged with 15.5 parts of calcium acetate monohydrate, 250 parts of toluene, 5.8 parts of antimony trioxide and 51 parts of acetic anhydride. The mixture was heated with stirring to the boiling point under a nitrogen atmosphere. A total of 98 parts of distillate were collected, during which time the temperature gradually increased to 109° C. and remained there for several minutes. The reaction mixture was then allowed to cool to ambient temperature, at which time the solid phase was isolated by filtration and dried under reduced pressure at a temperature of 80° C. Twenty one parts of a white powder were obtained, which was found to contain 13.87% calcium and 22.50% antimony. The DTA thermogram exhibited an endotherm indicative of a melting point at 235° C.

EXAMPLE 10

The reaction vessel was changed with 19.8 parts of manganese acetate tetrahydrate, 4.5 parts of zirconyl acetate and 250 parts of ethylene glycol. The mixture was heated with stirring to the boiling point (160° C.) under a nitrogen atmosphere. A total of 125 parts of distillate were collected, during which time the temperature gradually increased to 180° C. and remained there for several minutes. The reaction mixture was then allowed to cool to ambient temperature, at which time the solid phase was isolated by filtration, washed with anhydrous methanol and dried under reduced pressure at a temperature of 80° C. Fifteen parts of a pink-brown powder were obtained, which was found to contain 27.51% manganese and 17.78% zirconium. The DTA thermogram exhibited no endothermic peak up to 400° C. An exothermic peak indicative of degradation occurred at 415° C. The physical properties of the product are characteristic of an amorphous polymeric solid.

EXAMPLE 11

The reaction vessel was charged with 19.8 parts of manganese acetate tetrahydrate, 4.5 parts of zirconyl acetate and 222 parts of butyl alcohol. The mixture was heated with stirring to the boiling point (104° C.) under a nitrogen atmosphere. A total of 121 parts of distillate were collected, during which time the temperature gradually increased to 113° C. No further increase in reaction mixture temperature was observed. The reaction mixture was then allowed to cool to ambient temperature at which time the solid phase was isolated by filtration and dried under reduced pressure at a temperature of 80° C. Seventeen parts of a white powder were obtained, which was found to contain 22.11% manganese and 13.24% zirconium. The DTA thermogram exhibited an endotherm at 305° C.

EXAMPLE 12

The reaction vessel was charged with 19.8 parts of manganese acetate tetrahydrate, 4.5 parts of zirconyl acetate, 250 parts of toluene and 51 parts of acetic anhydride. The mixture was heated with stirring to the boiling point (90° C.) under a nitrogen atmosphere. A total of 99 parts of distillate were collected, during which time the temperature gradually increased to 110° C. and remained there for several minutes. The reaction mixture was then allowed to cool to ambient temperature, at which time the solid phase was isolated by filtration and dried under reduced pressure at a temperature of 80° C. Seventeen and one-half parts of a white powder were obtained, which was found to contain 21.72% manganese and 11.13% zirconium. The DTA thermogram exhibited an endotherm indicative of a melting point at 312° C.

EXAMPLE 13

The reaction vessel was charged with 17.2 parts of zinc acetate dihydrate, 4.5 parts of zirconyl acetate and 250 parts of ethylene glycol. The mixture was heated with stirring to the boiling point (167° C.) under a nitrogen atmosphere. A total of 125 parts of distillate were collected, during which time the temperature gradually increased to 185° C. and remained there for several minutes. The reaction mixture was then allowed to cool to ambient temperature, at which time the solid phase was isolated by filtration, washed with anhydrous methanol and dried under reduced pressure at a temperature of 80° C. Fourteen parts of a white powder were obtained, which was found to contain 32.85% zinc and 15.52% zirconium. The DTA thermogram did not exhibit any endotherm or exotherm within the range from 25° to 450° C. These properties are characteristic of an amorphous polymeric solid.

EXAMPLE 14

The reaction vessel was charged with 17.2 parts of zinc acetate dihydrate, 4.5 parts of zirconyl acetate and 222 parts of butyl alcohol. The mixture was heated with stirring to the boiling point (106° C.) under a nitrogen atmosphere. A total of 125 parts of distillate were collected, during which time the temperature gradually increased to 110° C. and remained there for several minutes. The reaction mixture was then allowed to cool to ambient temperature, at which time the solid phase was isolated by filtration and dried under reduced pressure at a temperature of 80° C. Twelve parts of a white powder were obtained, which was found to contain 32.3% zinc 2.91% zirconium. The DTA thermogram exhibited an endotherm characteristic of a melting point at 245° C.

EXAMPLE 15

The product, manganese antimony glycoxide, of Example 1 was used as the sole catalyst to prepare polyethylene terephthalate. A reactor was charged with 194 parts dimethyl terephthalate, 168 parts ethylene glycol and 0.16 part of manganese antimony glycoxide. The reactants were heated at 155°–200° C. with stirring under a nitrogen atmosphere until the calculated amount of methanol required for complete transesterification had been collected. The time required for this phase of the reaction was 30 minutes. The temperature of the reaction mixture was then raised to 250° C. and the reactor was evaluated using a vacuum pump. The pressure in the reactor gradually decreased to 0.3 millimeter of mercury as the unreacted ethylene glycol was distilled off. The temperature of the reaction mixture was then raised to 280° C. and the pressure maintained below 0.3 millimeter of mercury for 3 hours. The resultant highly viscous molten polyethylene terephthalate was removed from the reactor. A sample of this polymer exhibited an inherent viscosity of 0.5 and appeared white. The yellowness index value was 12. A thermogram of the polymer obtained using differential scanning calorimetry (DSC), exhibited an endotherm at 255° C, indicative of a melting point. The carboxyl content of the polymer was 31 equivalents per $10^6$ grams.

The yellowness index value of the polyester was determined using a Meeco Colormaster Differential Colorimeter manufactured by Manufacturers Engineering and Equipment Corp. This instrument measures the percent of incident green, red and blue light reflected from a plaque measuring about 0.1 inch (0.3 cm.) in thickness that was prepared by allowing molten polymer to cool between two stainless steel plates. The yellowness index (Y.I.) is calculated using the equation Y.I. = (% red reflectance − % blue reflectance) /% green reflectance.

For purposes of comparison with the present catalysts, polyethylene terephthalate was prepared using the foregoing procedure and a prior art catalyst system. The catalysts employed were 0.08 part manganese acetate tetrahydrate for the transesterification reaction and 0.25 part antimony triacetate for the polycondensation step. The transesterification reaction required 60 minutes to complete, at which time 0.14 part of tris-nonylphenyl phosphite was added as the sequestering agent, followed by 0.25 part of antimony triacetate as the polycondensation catalyst. The polycondensation reaction was carried out for 3 hours. The resultant polymer exhibited an inherent viscosity of 0.73, a gray color and a yellowness index of minus 3. The DSC melting point was 250° C. and the carboxyl content of the polymer was 26 equivalents per $10^6$ grams.

EXAMPLE 16 – 28

Polyethylene terephthalate was prepared using the procedure and amounts of reagents, including catalyst, specified in Example 15. The compounds disclosed in Examples 2–14 were employed as the sole catalyst at a level of 0.16 part. The catalyst and the time required to complete the transesterification reaction are summarized in the following table together with the inherent viscosity and yellowness index value of the final polymer. Unless otherwise specified the polycondensation reaction was conducted for three hours and the final polymer was white in color. The polymers of Examples 23, 24, 25 and 27 exhibited a slight off-white tinge which was not considered objectionable.

| Example | Catalyst | Transesterification Time (minutes) | Inherent Viscosity | Yellowness Index Value |
|---|---|---|---|---|
| 16 | Manganese Antimony Butoxide (Ex. 2) | 45 | 0.55 | 11 |
| 17 | Manganese Antimony Acetate (Ex. 3) | 25 | 0.63 | 12 |
| 18 | Zinc Antimony Glycoxide (Ex. 4) | 45 | 0.53 | 10 |
| 19 | Zinc Antimony Butoxide (ex. 5) | 30 | 0.73* | 13 |
| 20 | Zinc Antimony Acetate (Ex. 6) | 30 | 0.67 | 11 |
| 21 | Calcium Antimony Glycoxide (Ex. 7) | 120 | 0.59* | 6 |
| 22 | Calcium Antimony Butoxide (Ex. 8) | 105 | 0.43 | 12 |
| 23 | Calcium Antimony Acetate (Ex. 9) | 50 | 0.48 | 4 |
| 24 | Manganese Zirconium (IV) Glycoxide (Ex. 10) | 30 | 0.52 | 14 |
| 25 | Manganese Zirconium (IV) Butoxide (Ex. 11) | 30 | 0.57 | 14 |
| 26 | Manganese Zirconium (IV) Acetate (Ex. 12) | 45 | 0.62 | 13 |
| 27 | Zinc Zirconium (IV) Glycoxide (Ex. 13) | 30 | 0.64 | 15 |
| 28 | Zinc Zirconium (IV) Butoxide (Ex. 14) | 35 | 0.66 | 12 |

*Polycondensation conducted for 2 hours.

What is claimed is:

1. A method for producing high molecular weight, substantially colorless film and fiber-forming polyalkylene terephthalate whereby an alkylene glycol containing from 2 to 10 carbon atoms is reacted under ester interchange conditions with a lower dialkyl terephthalate wherein the alkyl portions of the dialkyl terephthalate each contain from 1 to 4 carbon atoms, and the resultant bis-hydroxyalkyl terephthalate is polycondensed at a temperature from 200 to 300° C. under reduced pressure and with the evolution of free glycol, said method being characterized in that the only catalyst present during the transesterification and polycondensation is from about 0.01 to about 0.3%, based on the weight of the lower dialkyl terephthalate, of a bimetallic compound obtained by reacting 1) a first compound selected from the group consisting of antimony (III) salts of monocarboxylic and dicarboxylic acids, zirconium (IV) salts of monocarboxylic and dicarboxylic acids, antimony (III) and zirconium (IV) alkoxides wherein each alkyl residue of said glycoxides contains from 1 to 12 carbon atoms, and antimony trioxide, 2) a second compound selected from the group consisting of zinc, calcium and manganese salts of monocarboxylic acids and zinc, calcium and manganese salts of dicarboxylic acids, the molar ratio of said first to said second compound being from 1:1 to 1:6, respectively, and 3) at least a stoichiometric amount of a third compound selected from the group consisting of anhydrides of monocarboxylic and dicarboxylic acids, alcohols containing from 1 to 20 carbon atoms and glycols containing from 2 to 20 carbon atoms, wherein the hydrocarbon residue of each of said monocarboxylic acids and dicarboxylic acids contains from 1 to 20 carbon atoms and is present as an aliphatic or aromatic group.

2. A method as set forth in claim 1 wherein the lower dialkyl terephthalate is dimethyl terephthalate and the alkylene glycol is ethylene glycol.

3. A method as set forth in claim 1 wherein the lower dialkyl terephthalate is a mixture of dimethyl terephthalate and dimethyl isophthalate wherein the isophthalate ester constitutes from 1 to 50% by weight of said mixture.

4. A method as set forth in claim 1 wherein each of said monocarboxylic acids corresponds to the general formula

wherein each R is individually selected from the group consisting of alkyl containing from 1 to 11 carbon atoms, cycloalkyl, aryl, alkaryl and aralkyl.

5. A method as set forth in claim 4 wherein each R is alkyl.

6. A method as set forth in claim 1 wherein each of said dicarboxylic acids corresponds to the general formula

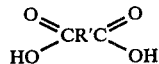

wherein each R' is individually selected from the group consisting of alkylene containing from 1 to 10 carbon atoms, cycloalkylene and arylene.

7. A method as set forth in claim 6 wherein each R is alkylene.

8. A method as set forth in claim 1 wherein said first compound is selected from the group consisting of antimony trioxide and zirconium salts of monocarboxylic acids containing from 2 to 20 carbon atoms.

9. A method as set forth in claim 8 wherein said first compound is antimony trioxide or zirconium acetate.

10. A method as set forth in claim 8 wherein said monocarboxylic acid is acetic acid.

11. A method as set forth in claim 1 wherein said second compound is a salt of acetic acid.

12. A method for producing high molecular weight, substantially colorless film and fiber-forming polyalkylene terephthalate whereby an alkylene glycol containing from 2 to 10 carbon atoms is reacted with terephthalic acid and the resultant bis-hydroxyalkyl terephthalate is polymerized at a temperature from 200° to 300° C. under reduced pressure and with the evolution of free glycol, said method being characterized in that the only catalyst present during the preparation of the polyalkylene terephthalate is from about 0.1 to about 0.3%, based on the weight of bis-hydroxyalkyl terephthalate, of a bimetallic compound obtained by reacting (1) a first compound selected from the group consisting of antimony (III) and zirconium (IV) salts of monocarboxylic and dicarboxylic acids, antimony (III) and zirconium (IV) alkoxides wherein each alkyl residue contains from 1 to 12 carbon atoms, and antimony trioxide, (2) a second compound selected from the group consisting of zinc, calcium and manganese salts of monocarboxylic and dicarboxylic acids, the molar ratio of said first to said second compound being from 1:1 to 1:6, respective respectively, and (3) at least a stoichiometric amount of a third compound selected from the group consisting of anhydrides of monocarboxylic and dicarboxylic acids, alcohols containing from 1 to 20 carbon atoms and glycols containing from 2 to 20 carbon atoms, wherein the hydrocarbon residue of each of said monocarboxylic acids and dicarboxylic acids contains from 2 to 20 carbon atoms and is present as an aliphatic or aromatic group.

13. A method as set forth in claim 12 wherein said alkylene glycol is reacted with a mixture containing terephthalic acid and up to 50%, based on the weight of said mixture of isophthalic acid.

14. A method as set forth in claim 12 wherein the alkylene glycol is ethylene glycol.

15. A method as set forth in claim 12 wherein each of said monocarboxylic acids corresponds to the general formula

wherein each R is individually selected from the group consisting of alkyl containing from 1 to 11 carbon atoms, cycloalkyl, aryl, alkaryl and aralkyl.

16. A method as set forth in claim 15 wherein each R is alkyl.

17. A method as set forth in claim 12 wherein each of said dicarboxylic acids corresponds to the general formula

wherein each R' is individually selected from the group consisting of alkylene containing from 1 to 10 carbon atoms, cycloalkylene and arylene.

18. A method as set forth in claim 17 wherein each R' is alkylene.

19. A method as set forth in claim 12 wherein said first compound is selected from the group consisting of antimony trioxide and zirconium salts of monocarboxylic acids containing from 2 to 20 carbon atoms.

20. A method as set forth in claim 19 wherein said first compound is antimony trioxide or zirconium acetate.

21. A method as set forth in claim 19 wherein said monocarboxylic acid is acetic acid.

22. A method as set forth in claim 12 wherein said second compound is a salt of acetic acid.

* * * * *